United States Patent
Ballarin

(10) Patent No.: US 11,352,068 B2
(45) Date of Patent: Jun. 7, 2022

(54) WHEEL-WELL CLOSURE SYSTEM FOR A MOTOR VEHICLE, AND MOTOR VEHICLE COMPRISING SUCH A SYSTEM

(71) Applicant: VOLVO TRUCK CORPORATION, Gothenburg (SE)

(72) Inventor: Paolo Ballarin, Saint Genis Laval (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 240 days.

(21) Appl. No.: 16/647,374

(22) PCT Filed: Oct. 13, 2017

(86) PCT No.: PCT/IB2017/001423
§ 371 (c)(1),
(2) Date: Mar. 13, 2020

(87) PCT Pub. No.: WO2019/073276
PCT Pub. Date: Apr. 18, 2019

(65) Prior Publication Data
US 2020/0283072 A1    Sep. 10, 2020

(51) Int. Cl.
B62D 25/16 (2006.01)
B60B 7/00 (2006.01)
B62D 35/00 (2006.01)

(52) U.S. Cl.
CPC ............ *B62D 25/16* (2013.01); *B60B 7/00* (2013.01); *B62D 35/00* (2013.01); *B60B 2900/1216* (2013.01)

(58) Field of Classification Search
CPC .......... B62D 25/16; B62D 35/00; B60B 7/00; B60B 2900/1216
See application file for complete search history.

(56) References Cited

U.S. PATENT DOCUMENTS 2,017,227 A * 10/1935 Barnhart .............. B62D 25/186
                                                          280/849
6,076,843 A *  6/2000 Sewell .................. B62D 25/18
                                                          280/157
(Continued)

FOREIGN PATENT DOCUMENTS

CN    204236600 U    4/2015
CN    105584534 A    5/2016
(Continued)

OTHER PUBLICATIONS

International Search Report and Written Opinion dated Jun. 22, 2018 in corresponding International PCT Application No. PCT/IB2017/001423, 8 pages.
(Continued)

*Primary Examiner* — Jacob B Meyer
(74) *Attorney, Agent, or Firm* — Venable LLP; Jeffri A Kaminski

(57) ABSTRACT

A wheel-well closure system for a motor vehicle has a wheel-arch delimiting a wheel-well and a wheel mounted in the wheel-well, the system comprising: a support structure connected to the wheel-arch; and a cover connected to the support structure and covering the wheel-well; wherein the cover is made of a flexible material and is secured to the wheel arch; wherein the system comprises a continuous annular part secured to the wheel facing the cover and rotating with the wheel about a horizontal axis; and wherein the support structure comprises an arm extending radially in front of the continuous annular part and against the cover, a steering movement of the wheel about a vertical axis causing
(Continued)

the continuous annular to push the support structure and stretch the cover outside the wheel-well.

18 Claims, 6 Drawing Sheets

(56) References Cited

U.S. PATENT DOCUMENTS

| | | | | |
|---|---|---|---|---|
| 11,072,374 | B2* | 7/2021 | Gandhi | B62D 25/161 |
| 2012/0013113 | A1* | 1/2012 | Trenne | B62D 25/182 |
| | | | | 280/849 |
| 2013/0096781 | A1* | 4/2013 | Reichenbach | B60Q 1/326 |
| | | | | 280/849 |
| 2016/0039484 | A1* | 2/2016 | Magee | B62D 25/16 |
| | | | | 29/428 |
| 2016/0059902 | A1 | 3/2016 | Xu et al. | |
| 2016/0250889 | A1* | 9/2016 | Fleck | B60B 7/066 |
| | | | | 301/37.102 |
| 2019/0009831 | A1* | 1/2019 | Albertson | B62D 35/008 |
| 2019/0084630 | A1* | 3/2019 | Potvin | B62D 37/02 |
| 2019/0210657 | A1* | 7/2019 | Gandhi | B62D 37/02 |
| 2019/0270486 | A1* | 9/2019 | Del Gaizo | B62D 25/16 |
| 2019/0300069 | A1* | 10/2019 | Angelo | B62D 9/00 |
| 2021/0179187 | A1* | 6/2021 | Angelo | B62D 35/001 |

FOREIGN PATENT DOCUMENTS

| | | | | |
|---|---|---|---|---|
| CN | 106995013 A | | 8/2017 | |
| DE | 723125 C | | 7/1942 | |
| DE | 4324024 A1 | * | 1/1995 | ........... B62D 25/161 |
| DE | 4324024 A1 | | 1/1995 | |
| DE | 19836851 C1 | | 3/2000 | |
| DE | 10108835 A1 | | 9/2002 | |
| DE | 10312089 A1 | * | 10/2004 | ........... B62D 25/182 |
| DE | 102012020669 A1 | * | 5/2013 | ............... B60B 7/00 |
| DE | 102016203199 A1 | * | 8/2017 | |
| DE | 102019000215 A1 | * | 8/2019 | |
| DE | 102018130879 A1 | * | 6/2020 | |
| FR | 2987804 A1 | * | 9/2013 | ........... B62D 25/186 |
| JP | H04176784 A | | 6/1992 | |
| JP | 2015009749 A | | 1/2015 | |
| SE | 1151032 A1 | * | 5/2013 | |
| WO | 2017081039 A1 | | 5/2017 | |
| WO | 2017103357 A1 | | 6/2017 | |

OTHER PUBLICATIONS

Chinese Office Action dated Jan. 17, 2022 in corresponding Chinese Patent Application No. 201780094821.8, 10 pages.

* cited by examiner

WHEEL-WELL CLOSURE SYSTEM FOR A MOTOR VEHICLE, AND MOTOR VEHICLE COMPRISING SUCH A SYSTEM

CROSS-REFERENCE TO RELATED APPLICATIONS

This application is a U.S. National Stage application of PCT/IB32017/001423, filed Oct. 13, 2017 and published on Apr. 18, 2019 as WO2019/073276 A1, all of which is hereby incorporated by reference in its entirety.

TECHNICAL FIELD OF THE INVENTION

The invention concerns a wheel-well closure system for a motor vehicle. The invention also concerns a motor vehicle, comprising at least one such wheel-well closure system.

BACKGROUND OF THE INVENTION

Improving aerodynamics is one the main focuses in any transportation industry to reduce fuel consumption. General rules are that a smooth shape is better than a rough one to improve air flow. This means that all gaps on the sides of a vehicle (right and left sides, but also top and bottom sides) should be "filled in" to remain as continuous as possible.

Classically, a motor vehicle comprises several wheels mounted in wheel-wells, each delimited by a wheel arch. Geometry of front wheel arches is hard to manage due to the fact that when turning, the wheels exceed the overall width of the vehicle.

Solutions aiming at closing that area (the gap between the wheel and the walls delimiting the well) are complicated to implement.

Mobile rigid pieces are the most common considered solution, but they require different sort of linkage systems to support the weight of the parts, pull or push them outwards, so the wheel does not hit them when turning.

DE 101 08 835 A1 discloses a wheel-well closure system, comprising a cover inserted into the wheel-well and partially covering the wheel. The cover is suspended to the wheel arch by means of a single suspension, such as a ball joint. The cover is held in the horizontal position by means of spring elements arranged on both front and rear sides of the cover.

Furthermore, roller elements are arranged on the inner side of the cover facing the wheel, such that during steering movement, the wheel touches one or more roller elements and rotates the cover outside the well, while the non-contacted region of the cover penetrates inside the well.

However, such system is not satisfactory in terms of aerodynamics. When a portion of the cover penetrates inside the well, a discontinuity is formed on the side of the vehicle. Moreover, this system leaves a radial gap between the cover and the wheel arch.

SUMMARY OF THE INVENTION

The aim of the invention is to provide an improved wheel-well closure system.

To this end, the invention concerns a wheel-well closure system for a motor vehicle, having a wheel-arch delimiting a wheel-well and a wheel system mounted in the wheel-well, the system comprising: a support structure connected to the wheel-arch; and a cover connected to the support structure and covering the wheel-well.

According to the invention:
- the cover is made of a flexible material and is secured to the wheel arch;
- the wheel system comprising at least a wheel, a continuous annular part secured to the wheel, facing the cover and rotating with the wheel about a horizontal axis; and
- the support structure comprises an arm extending radially in front of the continuous annular part and against the cover, a steering movement of the wheel about a vertical axis causing the continuous annular part of the wheel system to push the support structure and stretch the cover outside the wheel-well.

Thus, the wheel-well closure system improves aerodynamics of the motor vehicle, while taking into account the steering movements of the wheel inside its well, and with a good durability. Since the cover does not penetrate inside the well during the steering movement of the wheel, the system provides satisfying aerodynamics around the well, while avoiding direct contact between the wheel and the cover.

The system can advantageously equip heavy trucks. The gap between the wheel and the well walls can reach 100 to 200 mm (sometimes even more), so improving aerodynamics in this area is much more critical than for automobiles, having a smaller gap. Furthermore, their tires can be much narrower than the outer edge of the wheel arch, creating additional turbulences, so the benefits are quite high. Fully closing the wheel-well has other indirect benefits, such as avoiding soiling of door and side of the truck.

Alternatively, the system can equip any type of vehicle, such as an automotive, a bus or a coach, for improving the aerodynamic efficiency of the vehicle.

According to further aspects of the invention which are advantageous such a system may incorporate one or several of the following features.

In an embodiment, the arm of the support structure is positioned vertically and is articulated to an upper part of the wheel-arch about a pivot articulation having a horizontal axis parallel to a longitudinal direction of the motor vehicle.

Preferably, the support structure comprises a U-shaped bar having: a central portion connected to a lower portion of the arm; and two opposite end portions articulated to lateral parts of the wheel-arch, each about a pivot articulation having a horizontal axis parallel to a longitudinal direction of the motor vehicle.

Still preferably, the arm is provided with at least one contact element pushed by the continuous annular part of the wheel system during the steering movement of the wheel.

The arm can be provided with contact elements configured as fingers extending on both front and rear sides of the arm along the longitudinal direction of the motor vehicle.

As an alternative or a complement, the arm can have an upper portion provided with a contact element configured as a roller disposed in contact with the continuous annular part of the wheel system.

In another embodiment, the arm of the support structure is positioned horizontally, is made of an elastically deformable material and has two opposite ends secured to lateral parts of the wheel-arch.

Preferably, the arm has an intermediate portion provided with contact elements pushed by the continuous annular part of the wheel system during the steering movement of the wheel.

At least one of the contact elements can be configured as a finger arranged toward the continuous annular part of the wheel system.

As an alternative or a complement, at least one of the contact elements can be configured as a roller arranged toward the continuous annular part of the wheel system.

The continuous annular part of the wheel system pushing the contact element can be any part of the wheel system that forms a continuous circular surface or a continuous ring surface on the outer part of the wheel system i.e. the part that faces the cover e.g. a part of the tire, a part of the rim or an additional rotational part secured to the wheel.

In an embodiment, the wheel system comprises a rotating part secured to the wheel facing the cover and rotating with the wheel about a horizontal axis. In this embodiment, the rotating part can be a disk secured to the wheel around the horizontal axis. At least the rotating part or the arm is provided with a protruding contact element.

In another embodiment, the rotating part can be a tubular part secured to the wheel around the horizontal axis. In this case, an annular border of the rotating part located opposite the wheel pushes the arm during the steering movement of the wheel.

Preferably, the cover is directly secured to the wheel arch, without intermediate elements between the cover and the wheel arch.

Still preferably, the cover extends at least partly above an outer edge of the wheel-arch. Thus, no radial gap is left between the cover and the arch.

Still preferably, the cover is secured to the wheel-arch over an angle of at least 180° around the horizontal axis of the wheel.

According to other advantageous features of the invention:
- The rotating part can be secured to the wheel hub or to the wheel rim.
- The rotating part can be made of a plastic material or a metal material.
- The cover can be made of a textile, a synthetic material, preferably including neoprene. The material of the cover is chosen with a compromise between flexibility and resistance.
- The arm of the support structure can be made of a plastic material or a metal material. For example, the arm can be made of polycarbonate or reinforced polyamide as it is meant to have some flexibility.
- The contact elements can be made of a plastic material or a metal material. The contact elements can be made of the same material than the arm, in particular when the contact elements are fingers formed integral with the arm. Alternatively, the contact elements can be made of polyoxymethylene, in particular when the contact elements are rollers mounted rotatable relative to the arm.

The invention also concerns a motor vehicle, comprising at least one wheel-well closure system as mentioned hereabove.

Preferably, the motor vehicle comprises several steering wheels disposed in wheel-well, each equipped with a wheel-well closure system.

BRIEF DESCRIPTION OF THE DRAWINGS

The invention will now be explained in correspondence with the annexed figures, and as an illustrative example, without restricting the object of the invention. In the annexed figures.

DETAILED DESCRIPTION OF SOME EMBODIMENTS

Figure 1:
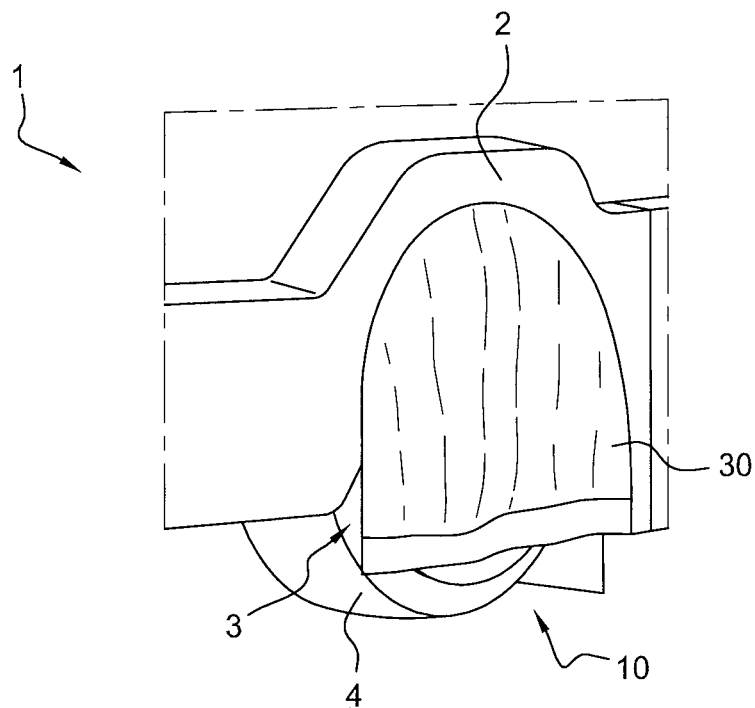
FIG. 1 is a perspective view of a wheel-well closure system according to the invention, equipping a front left wheel-well of a heavy truck, the system comprising a cover, together with a support structure and a wheel system.
Figure 2:
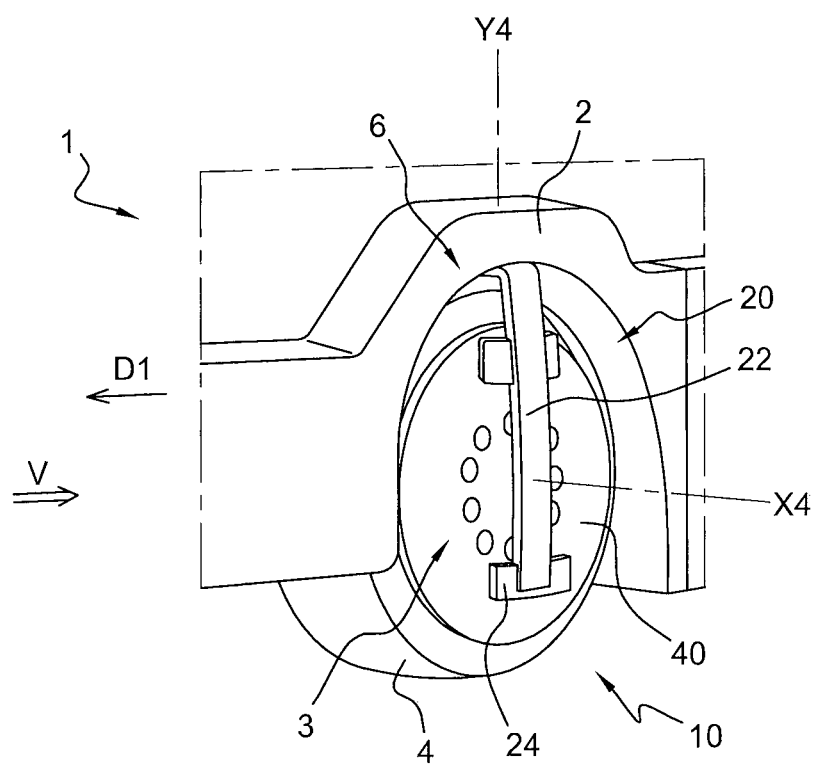
FIG. 2 is a perspective view similar to FIG. 1, showing a wheel system provided with a rotating part and a vertical arm of the support structure, without the cover and without a lower part of the support structure.
Figure 3:
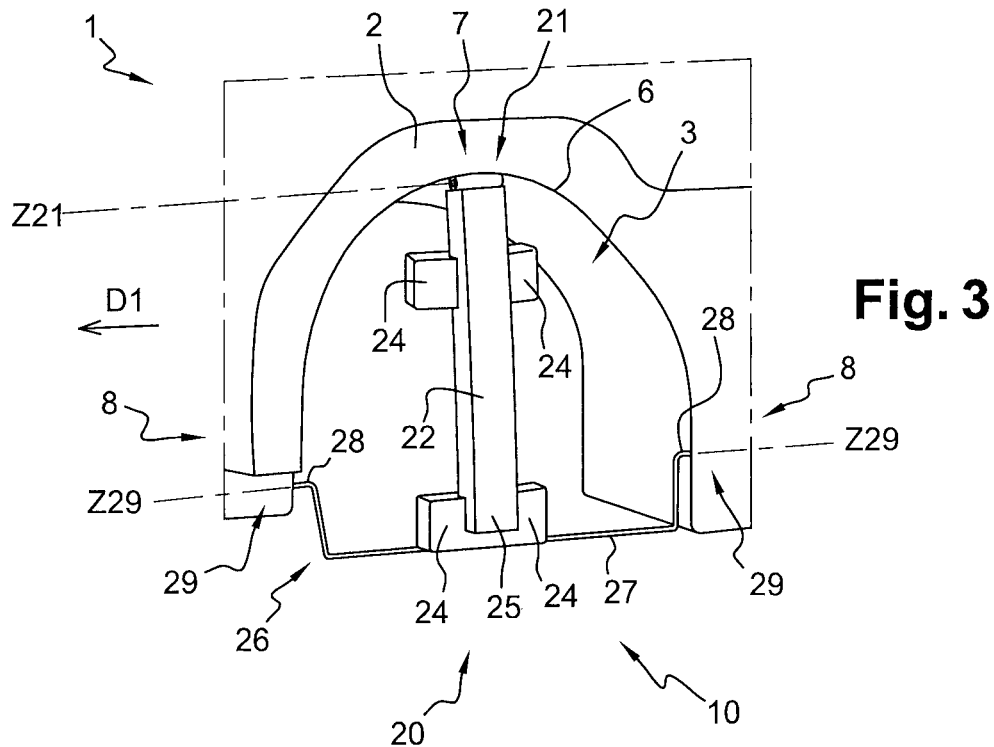
FIG. 3 is another perspective view of the system of FIGS. 1 and 2, without the cover and the wheel system, and with the lower part of the support structure.
Figure 4:
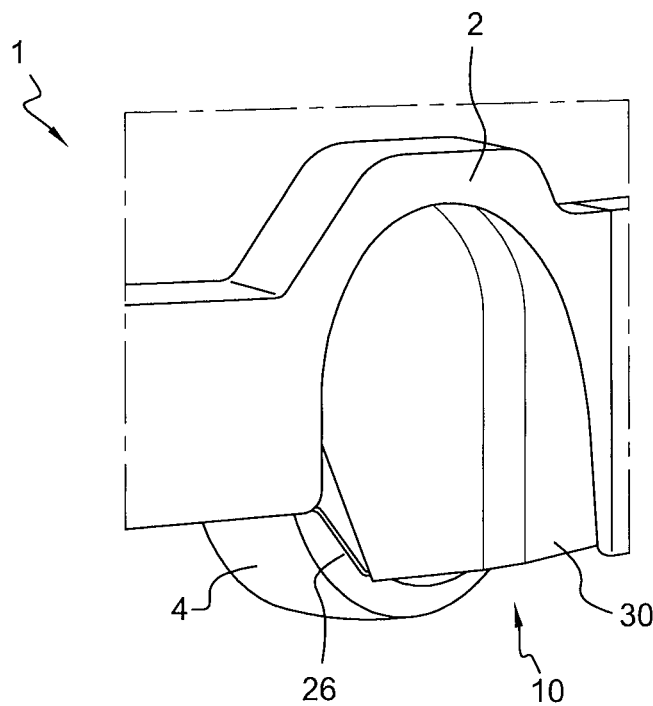
FIG. 4 is a perspective view similar to FIG. 1, during a steering movement of the wheel.
Figure 5:
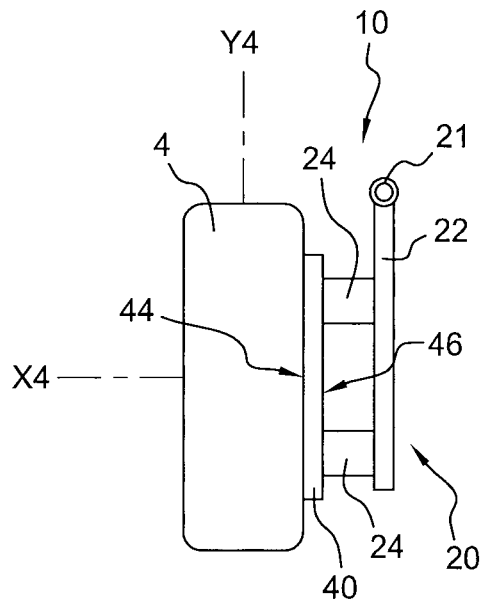
FIG. 5 is a schematic view along arrow V of FIG. 2, showing the wheel, the wheel system provided with a rotating part secured to the wheel, and the vertical arm provided with contact fingers.
Figure 6:
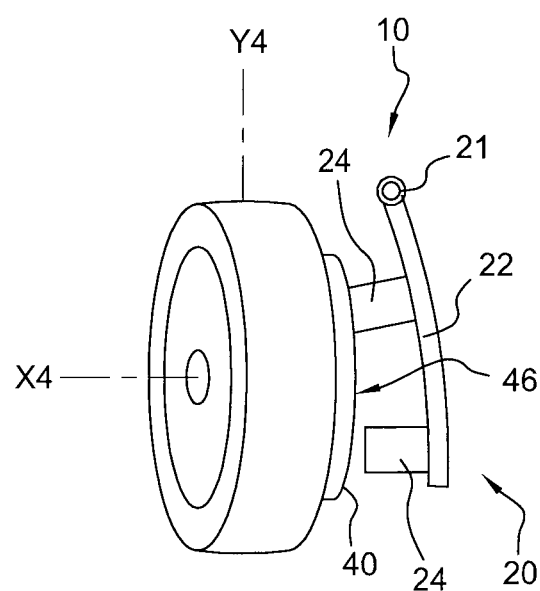
FIG. 6 is schematic view similar to FIG. 5, during a steering movement of the wheel.

FIGS. 1 to 6 discloses a first embodiment of a wheel-well closure system 10 according to the invention.

System 10 is mounted on a motor vehicle 1, having a vehicle body wheel-arch 2 delimiting a wheel-well 3 and a wheel system provided at least with a wheel 4 mounted in the wheel-well 3.

In this first embodiment, system 10 comprises a support structure 20 articulated to arch 2, a cover 30 connected to structure 20 and covering well 3, and a rotating part 40 secured to wheel 4 facing cover 30.

Part 40 rotates with wheel 4 about a horizontal axis X4, that is the axle axis of wheel 4. Part 40 is a disc secured to the hub or rim of wheel 4. Part 40 has an inner plane face 44 secured to wheel 4 and an outer plane face 46 facing structure 20 and cover 30.

Cover 30 is made of a flexible material and is secured to arch 2. Advantageously, cover 30 is directly secured to arch 2, without intermediate elements such as springs between cover 30 and arch 2. Preferably, cover 30 extends at least partly above an outer edge 6 of arch 2, so that no radial gap (relative to axis X4) is left between cover 30 and arch 2. Still preferably, cover 30 is secured to arch 2 over an angle of at least 180° around axis X4.

Structure 20 comprises a vertical arm 22 provided with fingers 24, and a horizontal U-shaped bar 26.

Arm 22 extends radially to axis X4 in front of part 40 and against cover 30. Arm 22 is positioned vertically and is articulated to an upper part 7 of arch 2, about a pivot articulation 21 having a horizontal axis Z21 parallel to a longitudinal direction D1 of vehicle 1. Arm 22 is provided with fingers 24 extending on both front and rear sides along direction D1. Fingers 24 constitute contact elements, intended to be pushed away by outer face 46 of part 40 during a steering movement of wheel 4.

Bar 26 has a horizontal central portion 27 connected to a lower portion 25 of arm 22, and two opposite end portions 28 articulated to lower lateral parts 8 of arch 2, each about a pivot articulation 29 having a horizontal axis Z29 parallel to a direction D1. Bar 26 extends horizontally against cover 30, under axis X4 and retains horizontally the lower part of the cover 30.

In practice, a steering movement of wheel 4 about a vertical axis Y4 causes outer face 46 of part 40 to push fingers 24, arm 22 and bar 26 outside well 3, opposite wheel 4. Thus, cover 30 connected to structure 20 is stretched outside well 3.

Since cover 30 does not penetrate inside well 3 during the steering movement and keeps a smooth taught surface, system 10 provides satisfying aerodynamics around well, while avoiding direct contact between wheel 4 and cover 30.

In another embodiment where the wheel system is not provided with a rotating part, contact elements 24 are pushed away by the continuous annular part located on the outer face of the wheel system such as a part of the tire or the rim.

Other embodiments of the invention are represented on FIGS. 7 to 16. In these embodiments, elements similar to the first embodiment have the same references and work in the same way. Only the differences with respect to the first embodiment are described hereafter.

Figure 7:
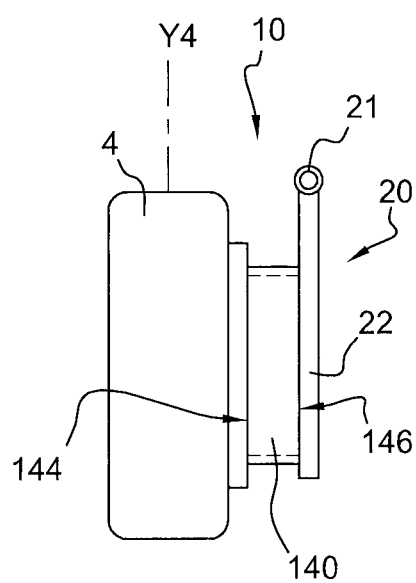
FIGS. 7 and 8 are schematic views similar to FIGS. 5 and 6, respectively, of another embodiment of a system according to the invention.
Figure 8:
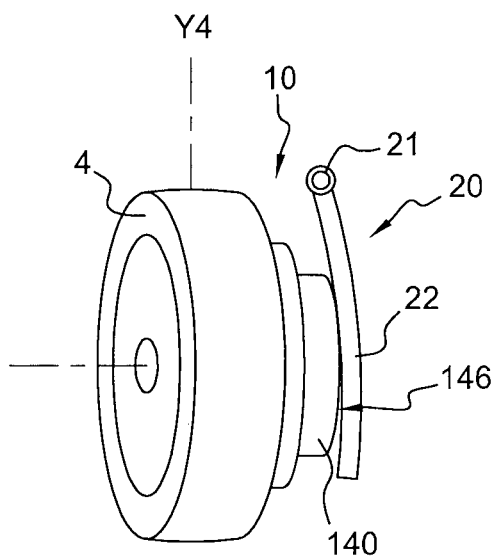

FIGS. 7 and 8 show a rotating part 140 configured as a tubular part.

An annular border 144 of part 140 is secured to the wheel 4, for example its hub or rim. The other annular border 146 of part 140, located opposite wheel 4, constitutes a contact element between part 140 and arm 22. Border 146 pushes arm 22 during steering movements of wheel 4.

Arm 22 can be devoid of contact elements, such as fingers. Alternatively, arm 22 can be provided with contact elements arranged in contact with border 146.

Figure 9:
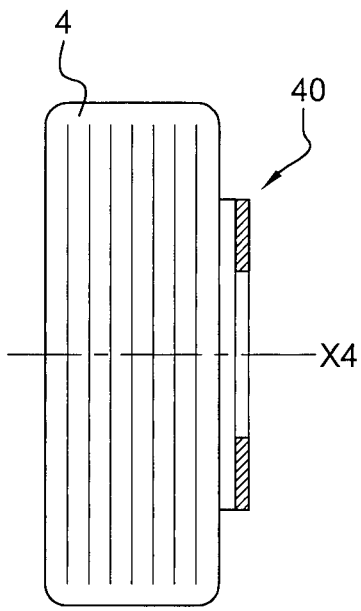
FIGS. 9 to 11 are schematic views similar to FIGS. 5 and 7, showing only the wheel and various embodiments of the rotating part.

FIG. 9 shows part 40 configured as a disc, with a central aperture.

Figure 10:
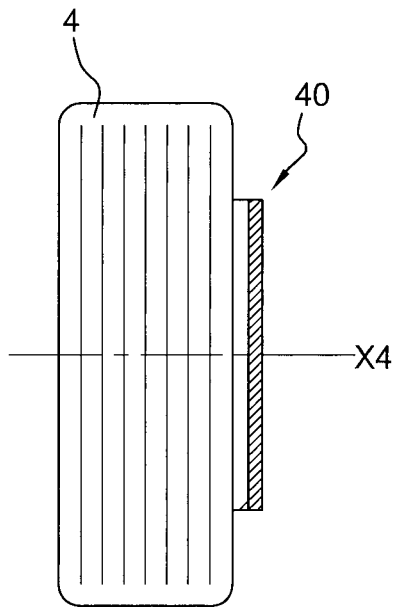

FIG. 10 shows part 40 configured as a disc, without central aperture.

Figure 11:
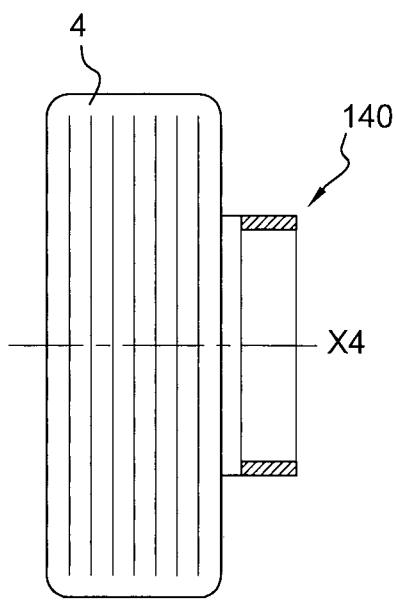

FIG. 11 shows part 140 configured as a tube.

Figure 12:
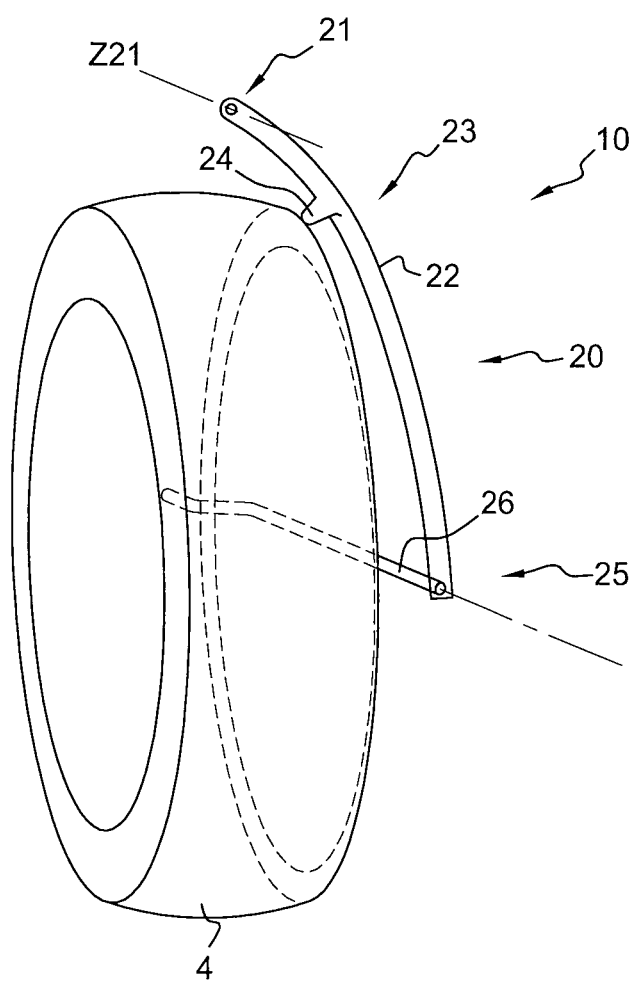
FIG. 12 is a partial perspective view of another embodiment of a system according to the invention.
Figure 13:
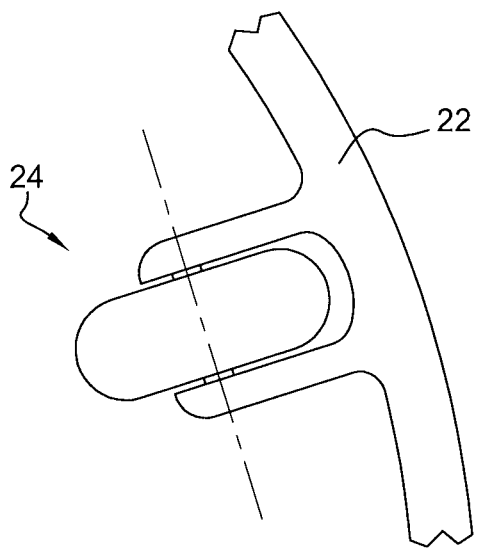
FIG. 13 is a front view at a larger scale of the contact element configured as a roller in the system of FIG. 12.

FIGS. 12 and 13 show arm 22 having an upper portion 23 provided with a contact element 24 configured as a roller disposed in contact with the continuous annular part of the wheel system. As shown in FIG. 12, the roller 24 is disposed in contact with the outer face of the tire of the wheel system.

In another embodiment where the wheel system is provided with a rotating part 40, the roller is disposed in contact with the part 40.

Figure 14:
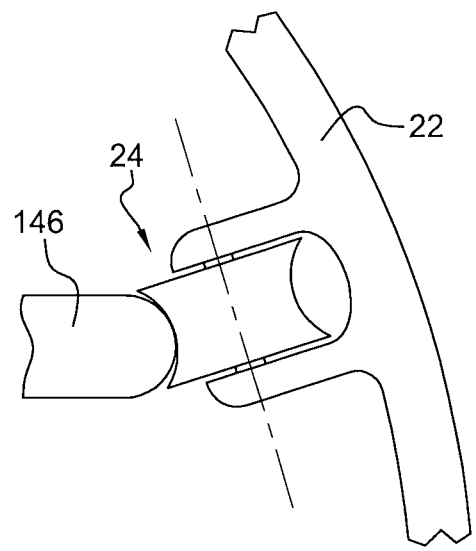
FIG. 14 is a view similar to FIG. 13, of an another embodiment of a system according to the invention.

FIG. 14 shows another embodiment where the wheel system is provided with a rotating part 40 and where the contact element 24 is configured as a recessed roller and disposed in contact with border 146 of the tubular part 140.

Alternatively, the contact element 24, configured as a recessed roller, can be disposed in contact with the border 146 of a tubular element secured to part 40 configured as a disc or with a protruding part of the wheel system, (when not provided with a rotating part) such as the border of the rim. Indeed the rim of the wheel element can have a cylindrical shape with a tubular protruding border, therefore forming a continuous annular part protruding from the outer face of the wheel system.

Figure 15:
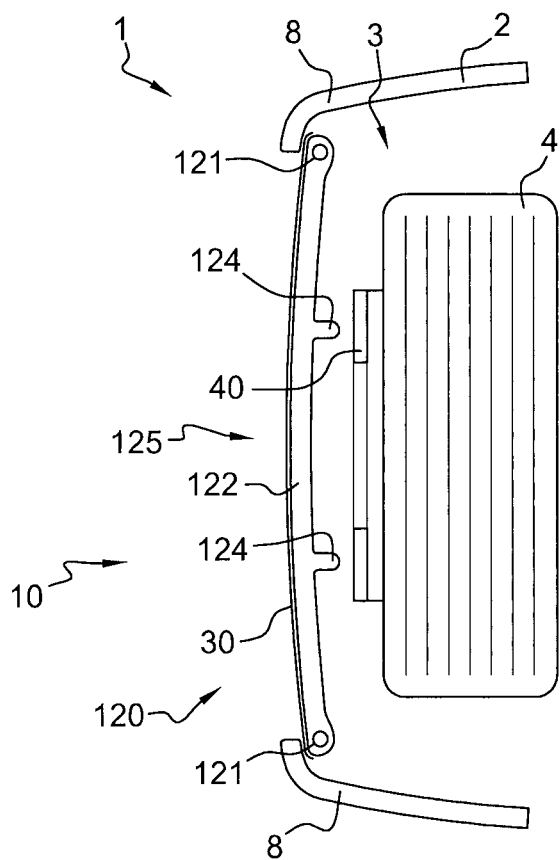
FIG. 15 is a top view of another embodiment of a system according to the invention.
Figure 16:
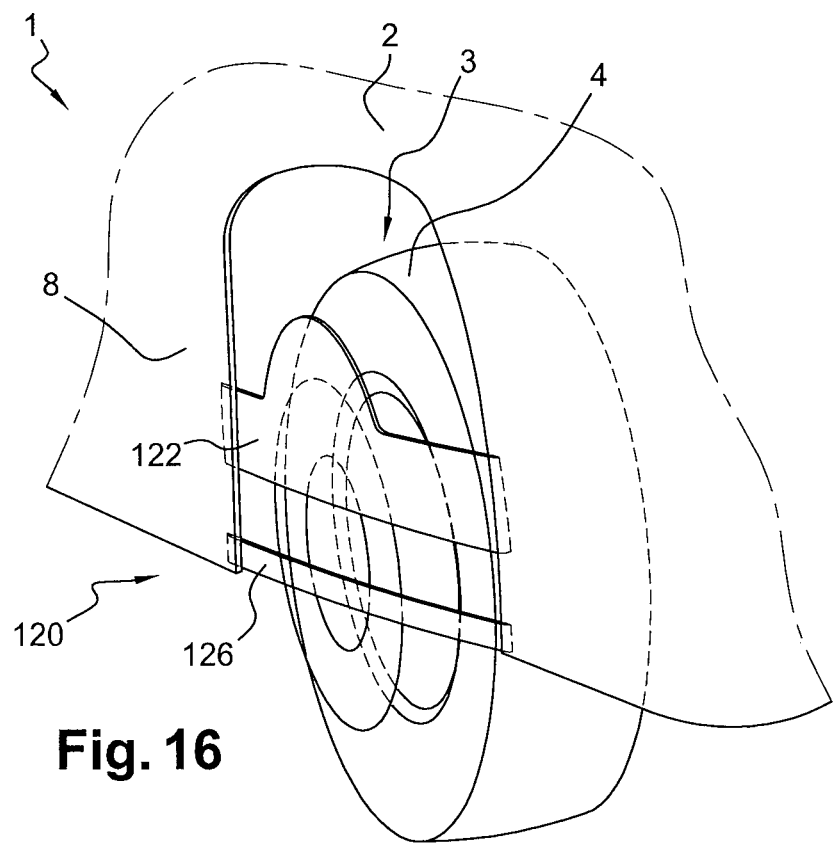
FIG. 16 is a partial perspective view of the system of FIG. 15.

FIGS. 15 and 16 show another embodiment of the system 10, having a support structure 120 comprising a horizontal arm 122.

Arm 122 is made of an elastically deformable material and has two opposite ends 121 secured to lateral parts 8 of arch 2. Arm 122 has an intermediate portion 125 provided with contact elements 124 pushed by part 40 during the steering movement of wheel 4. Elements 124 can be configured as fingers and/or rollers arranged toward part 40.

Structure 120 can comprise a second horizontal arm 126 arranged under arm 122 and having the same function as bar 26. Alternatively, when the wheel system is not provided with a rotating part, contact elements 124 can be pushed directly by a continuous circular part of the wheel system such as a part of the tire or the rim during the steering movement of wheel 4. Elements 124 can be configured as fingers and/or rollers arranged toward the wheel system. Structure 120 can comprise a second horizontal arm 126 arranged under arm 122 and having the same function as bar 26.

Other non-shown embodiments can be implemented within the scope of the invention. In addition, technical features of the different embodiments can be, in whole or part, combined with each other. Thus, the wheel-well closure system 10 can be adapted to specific requirements of the application.

The invention claimed is:

1. A wheel-well closure system for a motor vehicle, having a wheel-arch delimiting a wheel-well and a wheel system mounted in the wheel-well, the system comprising:
    a support structure connected to the wheel-arch; and
    a cover connected to the support structure and covering the wheel-well;
    wherein the cover is made of a flexible material and is secured to the wheel arch;
    wherein the wheel system comprises a wheel, a continuous annular part secured to the wheel facing the cover and rotating with the wheel about a horizontal axis; and
    characterized in that the support structure comprises an arm extending radially in front of the wheel system and against the cover, a steering movement of the wheel about a vertical axis causing the continuous annular part of the wheel system to push the support structure and stretch the cover outside the wheel-well.

2. The system according to claim 1, wherein the arm of the support structure is positioned vertically and is articulated to an upper part of the wheel-arch about a pivot articulation having a horizontal axis parallel to a longitudinal direction of the motor vehicle.

3. The system according to claim 2, wherein the support structure comprises a U-shaped bar having:
    a central portion connected to a lower portion of the arm; and
    two opposite end portions articulated to lateral parts of the wheel-arch, each about a pivot articulation having a horizontal axis parallel to a longitudinal direction of the motor vehicle.

4. The system according to any claim 2, wherein the arm is provided with at least one contact element pushed by the continuous annular part of the wheel system during the steering movement of the wheel.

5. The system according to claim 4, wherein the arm is provided with contact elements configured as fingers extending on both front and rear sides of the arm along the longitudinal direction of the motor vehicle.

6. The system according to claim 4, wherein the arm has an upper portion provided with a contact element configured as a roller disposed in contact with the continuous annular part of the wheel system.

7. The system according to claim 1, wherein the arm of the support structure is positioned horizontally, is made of an elastically deformable material and has two opposite ends secured to lateral parts of the wheel-arch.

8. The system according to claim 7, wherein the arm has an intermediate portion provided with contact elements pushed by the continuous annular part of the wheel system during the steering movement of the wheel.

9. The system according to claim 8, wherein at least one of the contact elements is configured as a finger arranged toward the continuous annular part of the wheel system.

10. The system according to claim 8, wherein at least one of the contact elements is configured as a roller arranged toward the continuous annular part of the wheel system.

11. The system according to claim 1, wherein the continuous annular part of the wheel system is a part of the tire facing the cover.

12. The system according to claim 1, wherein the continuous annular part of the wheel system is a part of the rim facing the cover.

13. The system according to claim 1, wherein the continuous annular part of the wheel system is a rotating part secured to the wheel facing the cover and rotating with the wheel about a horizontal axis.

14. The system according to claim 1, wherein the rotating part is a disk secured to the wheel around the horizontal axis, and wherein at least the rotating part or the arm is provided with a protruding contact element.

15. The system according to claim 1, wherein the rotating part is a tubular part secured to the wheel around the horizontal axis, and wherein an annular border of the rotating part located opposite the wheel pushes the arm during the steering movement of the wheel.

16. The system according to claim 1, wherein the cover is directly secured to the wheel-arch.

17. The system according to claim 1, wherein the cover extends at least partly above an outer edge of the wheel-arch.

18. Motor vehicle, comprising at least one wheel-well closure system according to claim 1.

* * * * *